Feb. 24, 1925.

J. LALLY 1,527,314

JIG FOR FILLING COLUMNS

Filed June 12, 1923      2 Sheets-Sheet 1

John Lally
INVENTOR

BY Robert B Killgore
ATTORNEY

Feb. 24. 1925.

J. LALLY

JIG FOR FILLING COLUMNS

Filed June 12, 1923   2 Sheets-Sheet 2

1,527,314

John Lally
INVENTOR

BY Robert B. Killgore
ATTORNEY

Patented Feb. 24, 1925.

1,527,314

UNITED STATES PATENT OFFICE.

JOHN LALLY, OF BOSTON, MASSACHUSETTS.

JIG FOR FILLING COLUMNS.

Application filed June 12, 1923. Serial No. 644,873.

*To all whom it may concern:*

Be it known that I, JOHN LALLY, a citizen of the United States, residing at Boston, in the county of Suffolk and State of Massachusetts, have invented certain new and useful Improvements in Jigs for Filling Columns, of which the following is a specification.

My invention relates to jigs for holding the parts of building columns during assembly and it is my object to construct a jig which will hold the bases and tubes in alinement while the concrete filling is being poured, in which the filled columns will be solidly clamped until the filling has set, to so construct the jig that it will hold columns of different diameters or lengths and to provide the jig with quick acting clamps to hold the tubes in place.

Figure 1:
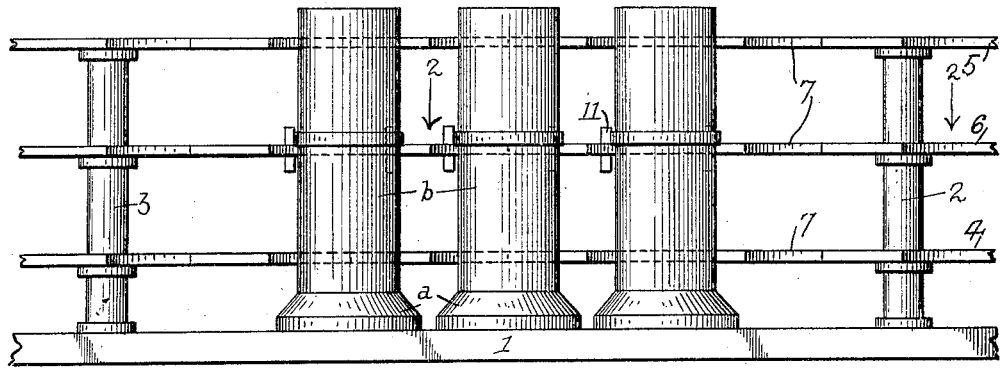
Figure 2:
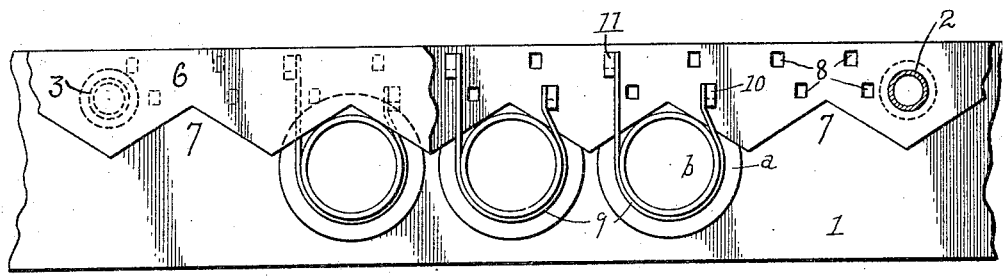
Figure 3:
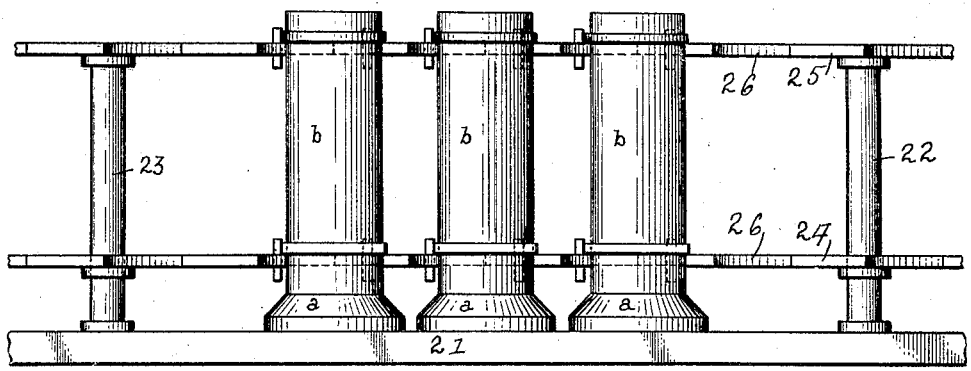
Figure 4:
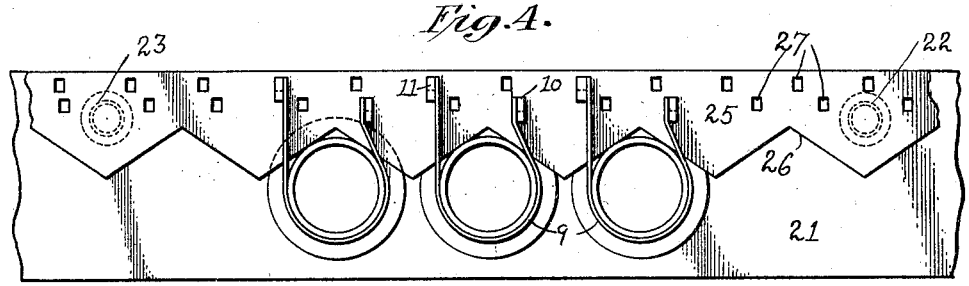

In the drawing Fig. 1 is a front view of the preferred form of my jig, with columns therein; Fig. 2 a top view of the structure of Fig. 1 on the line 2—2 thereof; Fig. 3 a front view of a modified form of jig, with columns therein; Fig. 4 a top view of the structure of Fig. 3 and Fig. 5 a plan view of the preferred form of clamp.

As shown in Figs. 1 and 2 the jig consists of a plane base 1 having uprights 2 and 3 thereon. These uprights carry notched racks 4, 5 and 6 arranged parallel with each other and with the base 1.

These racks are provided with V-notches 7—7 at intervals and in erecting the jig it is essential that the V-notches in the three racks exactly aline so that a tube or pipe pushed into alined notches will be at right angles to the base 1.

The middle rack 6 is provided with rectangular apertures 8—8 preferably arranged in staggered rows as shown in Fig. 2.

These racks and the base are made of any desired length and spacing and a suitable number of uprights are employed to give rigidity to the structure. The notches may be of any desired shape, spacing or size.

Figure 5:
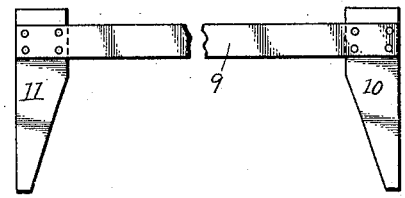

The preferred form of clamp is shown in Fig. 5 and consists of a flexible metal band 9 having rigid wedge ends 10 and 11 secured thereto, the inclined faces of the wedges being toward one another.

In Figs. 3 and 4 I have shown a slight modification of the jig wherein the base 21 carries the uprights 22 and 23 and but two racks 24 and 25 are employed, notches 26—26 being formed therein. Both of these racks 24 and 25 are provided with the rectangular apertures 27 and in use two clamps are used on each column, one in the top rack and one in the bottom rack.

In use the bases *a* of the columns are laid on the base plate 1, under alined notches, and the pipes or tubes *b* are set into the bases and also into the alined notches in the racks. One wedge of a clamp is inserted into an appropriate aperture in the rack 6 and the flexible band 9 passed around the pipe *b* and the other wedge inserted into an appropriate aperture. The wedges are then driven home forcing the pipe solidly into the notches in the racks and holding it solidly at right angles to the column base *a*.

When the jig is full a travelling bucket pours the concrete into each pipe until it is full after which the concrete is allowed to set. The wedges are then knocked out of the apertures to remove the clamps and the columns are taken out of the notches.

I prefer to use the form of jig shown in Figs. 1 and 2 as the operation of setting and removing one clamp instead of two is quicker and simpler.

While I have shown and described the band and wedge clamp I preferably employ on account of its simplicity, other devices may be used for locking the pipe to the racks.

It is apparent that columns of any length may be assembled and filled in my jig as the pipe or tube will simply extend more or less above the upper rack and that columns of any diameter may be secured therein as the pipes or tubes will enter more or less into the notches in the racks but in all cases will be held at right angles to the base plate. By spacing the wedge holes in two staggered lines it is always possible to select two apertures for the wedges which will allow the slack in the clamp band to be taken up when the wedges are driven home regardless of the diameter of the pipe or tube.

If desired the notches may be omitted from the middle rack 6 in the structure of Figs. 1 and 2 and the rack 6 used as a means for holding the clamps in place.

I claim:—

1. A jig for filling columns and the like comprising a base, a plurality of racks thereover provided with alined notches and with apertures and a co-acting clamp composed of a strip of flexible material and wedges on each end of said strip, said wedges being adapted to enter rack apertures.

2. A jig for filling columns and the like comprising a plane base, a pair of racks thereover and parallel therewith, said racks being provided with alined V-notches, and co-operating means engaging the racks for forcing a column body into said notches.

3. A jig for filling columns and the like comprising a plane base, a pair of racks thereover and parallel therewith, said racks being provided with alined V-notches, and a co-acting clamp composed of a strip of flexible material and wedges on each end of said strip, said wedges being adapted to enter rack apertures to force the column bodies into the notches.

In testimony whereof I have affixed my signature.

JOHN LALLY.